United States Patent [19]

Yamada et al.

[11] Patent Number: 5,175,635

[45] Date of Patent: Dec. 29, 1992

[54] PICTURE PRINTING APPARATUS USING MULTIVALUED PATTERNS, BINARY PATTERNS AND DITHER PATTERNS SELECTIVELY

[75] Inventors: Kiyoshi Yamada, Chigasaki; Shuzo Hirahara, Yokohama; Toshikazu Matsui, Tokyo; Kazuhiko Higuchi, Kawasaki, all of Japan

[73] Assignee: Kabushiki Kaisha Toshiba, Kanagawa, Japan

[21] Appl. No.: 703,052

[22] Filed: May 17, 1991

Related U.S. Application Data

[63] Continuation of Ser. No. 524,697, May 17, 1990, abandoned, which is a continuation of Ser. No. 398,329, Aug. 24, 1989, abandoned, which is a continuation of Ser. No. 213,486, Jun. 30, 1988, abandoned, which is a continuation of Ser. No. 55,930, Jun. 1, 1987, abandoned.

[30] Foreign Application Priority Data

Jun. 2, 1986 [JP] Japan ................. 61-127617
Dec. 22, 1986 [JP] Japan ................. 61-303672

[51] Int. Cl.⁵ ............................................... H04N 1/40
[52] U.S. Cl. ..................................... 358/467; 358/462
[58] Field of Search ............................. 358/462, 467

[56] References Cited

U.S. PATENT DOCUMENTS

| | | | |
|---|---|---|---|
| 4,194,221 | 3/1980 | Stoffel | 358/283 |
| 4,288,821 | 9/1981 | Lovallee et al. | 358/283 X |
| 4,400,738 | 8/1983 | Tomory et al. | 358/462 X |
| 4,412,225 | 10/1983 | Yoshida et al. | 358/75 ij X |
| 4,438,453 | 3/1984 | Alston | 358/75 X |
| 4,447,830 | 5/1984 | Stoffel | 358/462 |
| 4,467,195 | 8/1984 | Kawamura et al. | 250/216 |
| 4,547,811 | 10/1985 | Ochi et al. | 358/282 X |
| 4,549,220 | 10/1985 | Suzuki | 358/283 |
| 4,633,328 | 12/1986 | Saito et al. | 358/467 X |
| 4,663,662 | 5/1987 | Sekizawa et al. | 358/75 |
| 4,727,430 | 2/1988 | Miwa | 358/459 |
| 4,729,035 | 3/1988 | Tanioka | 358/283 X |
| 4,847,654 | 7/1989 | Honma et al. | 358/458 X |
| 4,897,736 | 1/1990 | Sugino | 358/459 X |
| 4,926,248 | 5/1990 | Kobayashi et al. | 358/459 X |
| 4,930,007 | 5/1990 | Sugiura et al. | 358/467 X |
| 4,953,012 | 8/1990 | Abe | 358/462 |

OTHER PUBLICATIONS

Patent Abstracts of Japan, vol. 7, No. 44 (M-195) [1189], Feb. 22, 1983, Corresponding to Japanese Publication No. 57 193 376.

Y. Tokunaga et al., IEEE Transactions on Electron Devices, vol. ED-30, No. 8, Aug. 1983, pp. 898-904, "New Gray-Scale Printing Method Using a Thermal Printe".

Takashima et al., Proceedings of the '86 National Convention Record of the Institute of Electronics and Communication Engineers of Japan, 1319, part 5, p. 164, Mar. 23, 1986.

Nagaoka et al., Proceedings of the 14th National Convention Record of the Institute of Image Electronics Engineers of Japan, Jun. 3, 1986.

Ibaraki et al., Proceedings of the 14th National Convention Record of the Institute of Image Electronics Engineers of Japan, 3, Jun. 3, 1986.

Primary Examiner—James J. Groody
Assistant Examiner—Mark R. Powell
Attorney, Agent, or Firm—Finnegan, Henderson, Farabow, Garrett and Dunner

[57] ABSTRACT

A picture printing apparatus is disclosed which includes a picture type judgement means, and a best mode printing system is determined according to the judging result. A mixed mode picture including a binary picture element and a gradational picture element is printed to utilize selectively the binary method, multivalence concentration pattern method and the dither method.

2 Claims, 13 Drawing Sheets

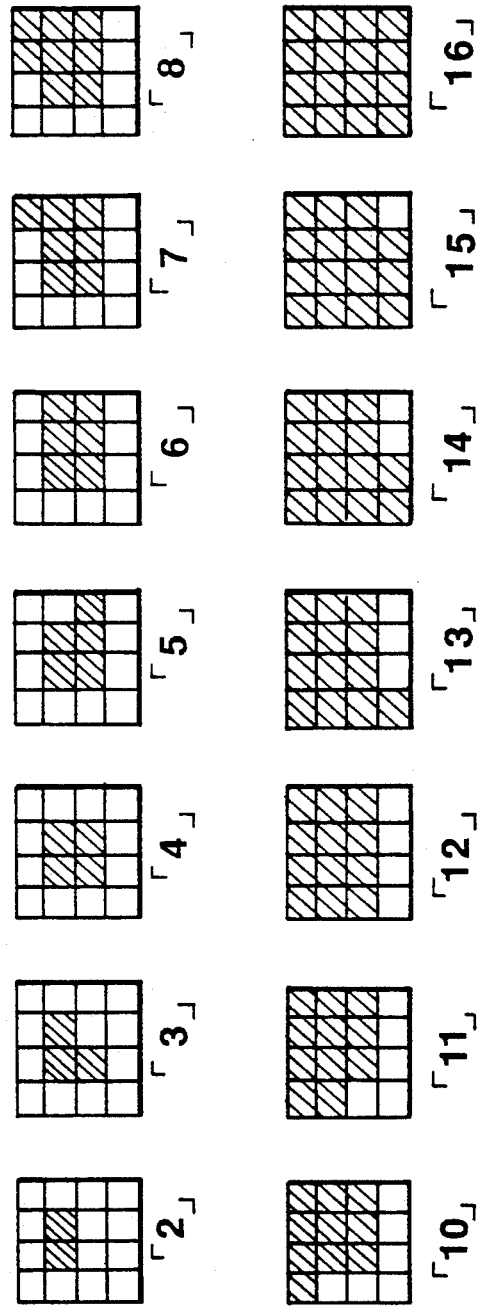

FIG.6(a)
FIG.6(b)
FIG.6(c)
FIG.6(d)
A : MULTIVALENCE PICTURE
B : INDEFINITE (DITHER)
C : BINARY PICTURE.
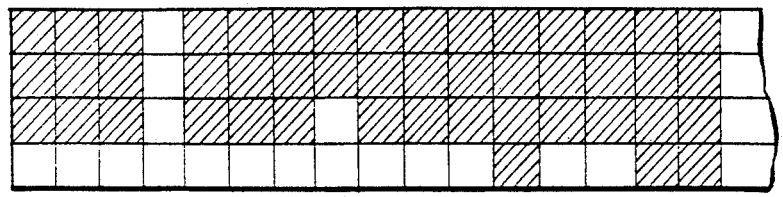
FIG.6(e)
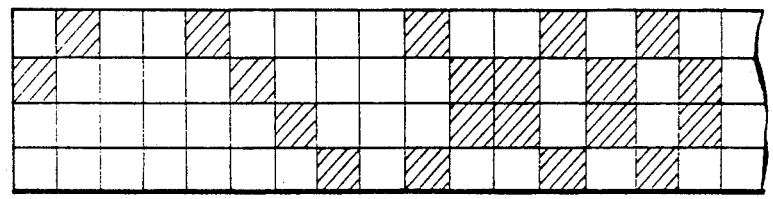
FIG.6(f)

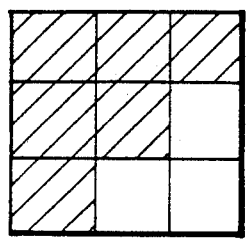 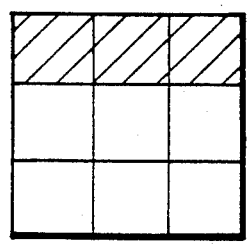 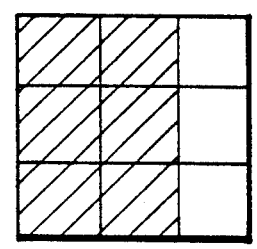
FIG.12(a) FIG.12(b) FIG.12(c)
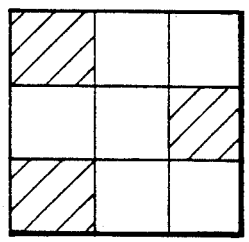 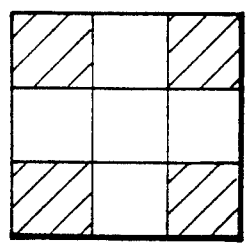 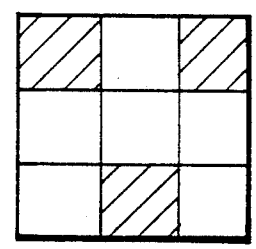
FIG.13(a) FIG.13(b) FIG.13(c)

FIG.16(a)
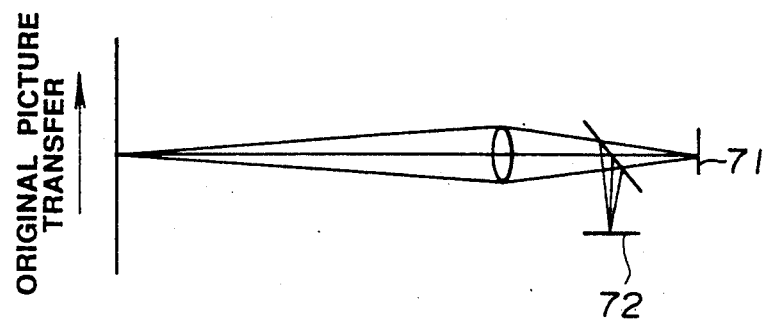
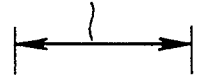
ONE COLOR ELEMENT
FIG.16(b)
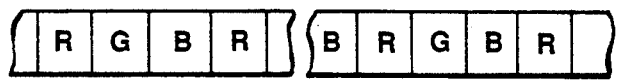
FIG.16(c)
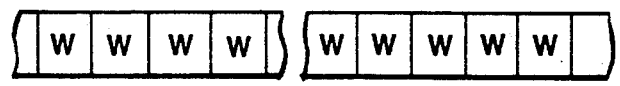

PICTURE PRINTING APPARATUS USING MULTIVALUED PATTERNS, BINARY PATTERNS AND DITHER PATTERNS SELECTIVELY

This application is a continuation of application Ser. No. 07/524,697, filed May 17, 1990, which is a continuation of Ser. No. 07/398,329, filed Aug. 24, 1989, which is a continuation of Ser. No. 07/213,486, filed Jun. 30, 1988, which is in turn a continuation of Ser. No. 07/055,930, filed Jun. 1, 1987 now all abandoned.

BACKGROUND OF THE INVENTION

1. Field of the Invention

This present invention relates to a picture printing apparatus, and more particularly to a picture printing apparatus wherein the picture is printed based upon the features of an original picture.

2. Description of the Prior Art

A thermal transfer printing system is a transfer system which transfers the ink of an ink film coated with thermal melting or thermal sublimating ink to the printing paper by a thermal head. The thermal head is heated by applying power to a thermal resistance element. A thermal transfer printing system using the thermal melting ink, is suitable particularly for binary images having only "1" and "0" concentration levels. For multivalved pictures, that is, gradational pictures including halftone pictures, a special concentration modulation technique is necessary. For this concentration modulation technique, a pseudo-halftone printing system for expressing the halftone picture has been attempted by modifying dot density or the ink occupation ratio over a constant area. This is a system widely used to display the gradations with a dot printer that has only a binary concentration expression ability. Typical examples of this method include the dither method, fixed concentration pattern method and multivalved concentration pattern method.

With the dither method, the concentration level of dots in portions of the original picture are compared with threshold levels corresponding to the location of those portions. The dots of a given portion are only printed when the threshold level is exceeded. The dither method is a method to make multivalved pictures in a binary way using threshold patterns (shown in FIG. 1), and the thermal energy supplied to every dot is the same. Therefore this dither method prints a picture in accordance with a variable gradation by controlling the number of printing dots and the ink occupation ratio in a given part of the picture.

With the fixed concentration pattern method, dots are printed according to the element pattern shown in FIG. 2 based on the dot concentration of the corresponding picture element of the original picture.

A multivalved concentration pattern method has been developed by the present inventors, as described in U.S. patent application Ser. No. 821,954, now U.S. Pat. No. 4,724,446. With the dither method and the fixed concentration pattern method, it is difficult to obtain clear and natural pictures taking into account the visual characteristics of a human being. Further, owing to the adverse influence of the thermal storage effect in the thermal head, discontinuities of gradation are formed in the medium and high concentration areas, unevenness results from unstable ink adhesion in the low and medium concentration areas, and so on.

According to this multivalved concentration pattern method developed by the present inventors, the thermal storage effect of the thermal head that was considered conventionally to be a hindrance in producing good prints, can be positively utilized, and smooth pictures of high quality can be produced with a stabilized gradation.

This multivalved concentration pattern method utilizes three dot patterns "A," "B," and "C", corresponding to the low, medium and high concentration levels, respectively, and also corresponding to the energy areas supplied to the thermal head. The energy areas are mutually related to the printing concentration.

For example, as shown in FIGS. 3 and 4, the low concentration fixed pattern "A" is an isolated dot pattern formed by isolating one dot in a picture element, and the gradations in the low concentration area are expressed by modulating the printing energy (energy supplied to the thermal head) and changing the dot size. The medium concentration fixed pattern "B" is a stripe shaped pattern extending in the relative transfer direction (subscanning direction) between the thermal head and printing paper, and the gradations in the medium concentration area are expressed by changing the stripe width by the energy supplied to the thermal head. Furthermore, the high concentration fixed pattern "C" is an L-shaped pattern combined with a white section of dimension 2×2, and the gradations of high concentration are expressed by changing the size of the white section in proportion to the remaining portion of the L-shaped dot pattern.

The concept of this multivalved concentration method was disclosed by the present inventors in Proceedings of 3rd Japanese Symposium on Non-Impact Printing Technologies reporting the results of the Symposium held on Jul. 24 and 25, 1986.

Either the multivalved concentration pattern method or the fixed concentration pattern method may be used for good quality printing of multivalved pictures, but if the multivalence pattern method is used for printing binary pictures, poor quality pictures result because the matrix is enlarged. For this reason, mixed multivalved and binary pictures cannot be printed clearly, because the binary portion has such a low resolution.

Thus, there is a problem of decreased resolution when binary pictures are printed by using the fixed concentration pattern method or the multivalved concentration pattern method.

Another printing method was proposed in Laid Open Japanese Application No. 1986-82577 for printing mixed pictures of the multivalved and binary type. In this system, pictures are printed by either the binary printing method or the dither method, or a combination of the two, with halftone pictures being printed by the dither method. All gradational parts are printed by the dither method. Thus, due to the influence of the thermal storage effect in the medium and high concentration areas, all of the adverse effects described previously are encountered.

SUMMARY OF THE INVENTION

It is an object of present invention to provide a new and improved picture printing apparatus particularly suitable for printing pictures with mixed binary picture elements and halftone picture elements.

Additional objects and advantages will be obvious from the description which follows, or may be learned by practice of the invention.

According to this invention, a picture printing apparatus to select the printing method depends upon the result of a judgement of the features of the original picture and comprises three kinds of picture signal generating means, and a picture type judgement means, a picture signal switching means.

BRIEF DESCRIPTION OF THE DRAWINGS

The accompanying drawings, which are incorporated in and constitute a part of the specification, illustrate embodiments of the invention, and together with the description, serve to explain the principles of the invention.

BRIEF SUMMARY OF THE DRAWINGS

Figure 5:
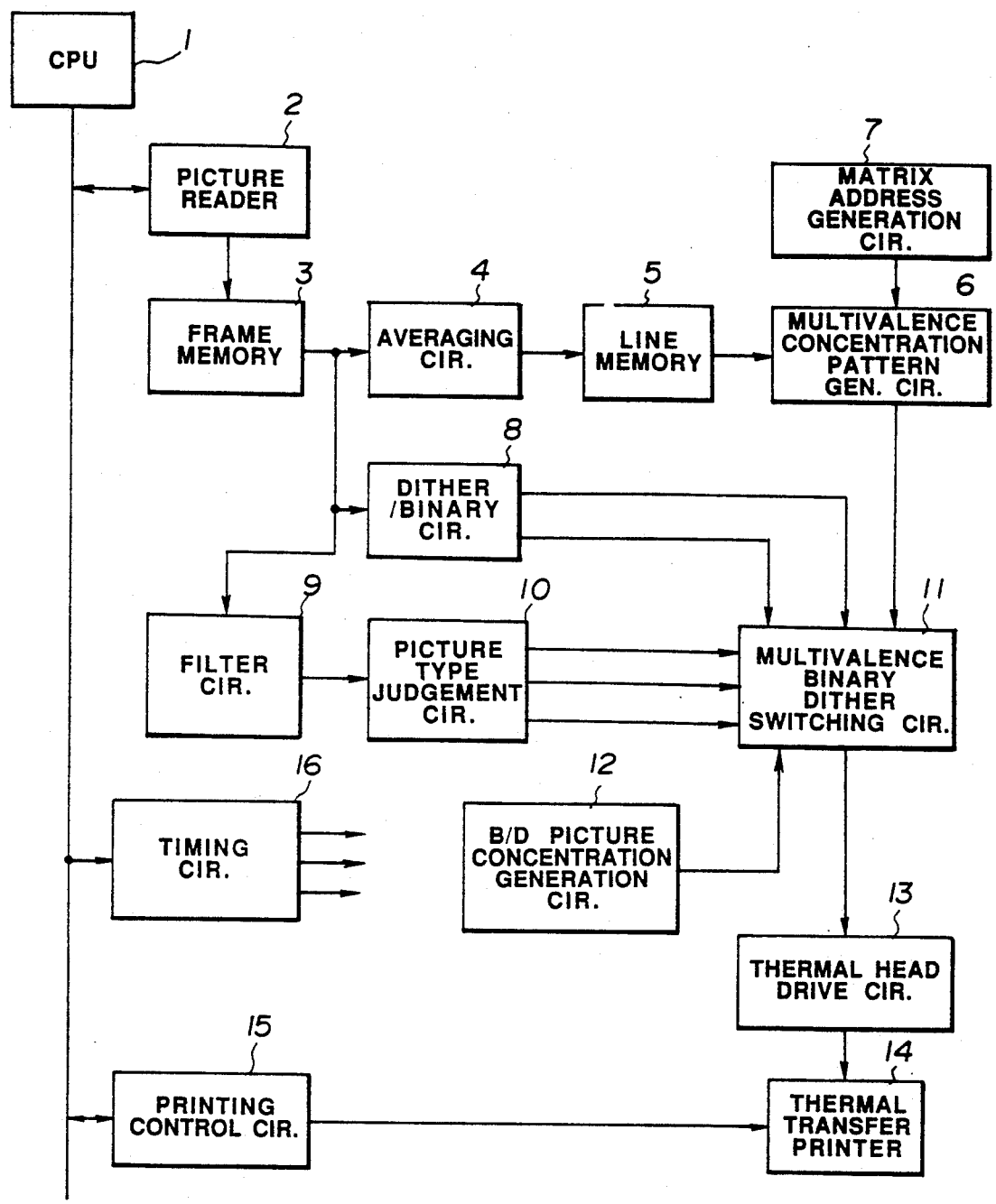
Figure 7:
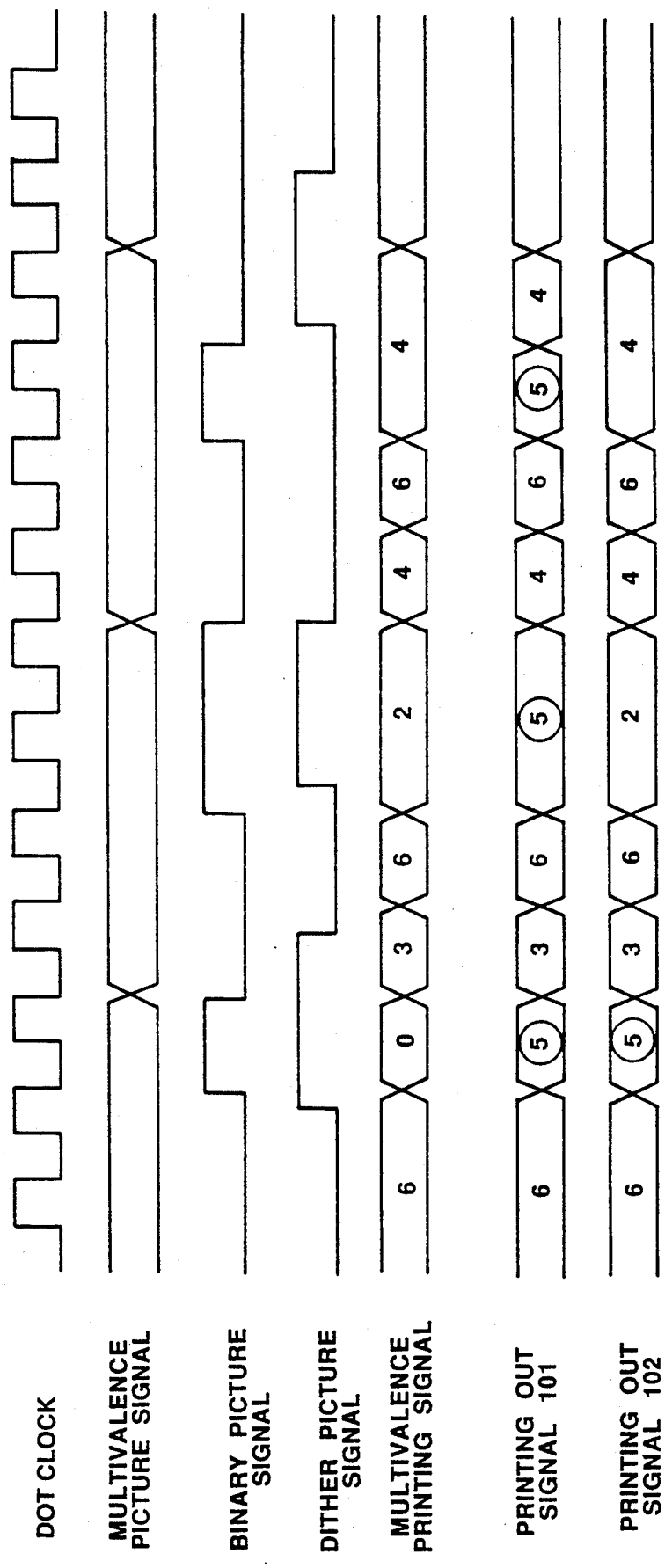
Figure 8:
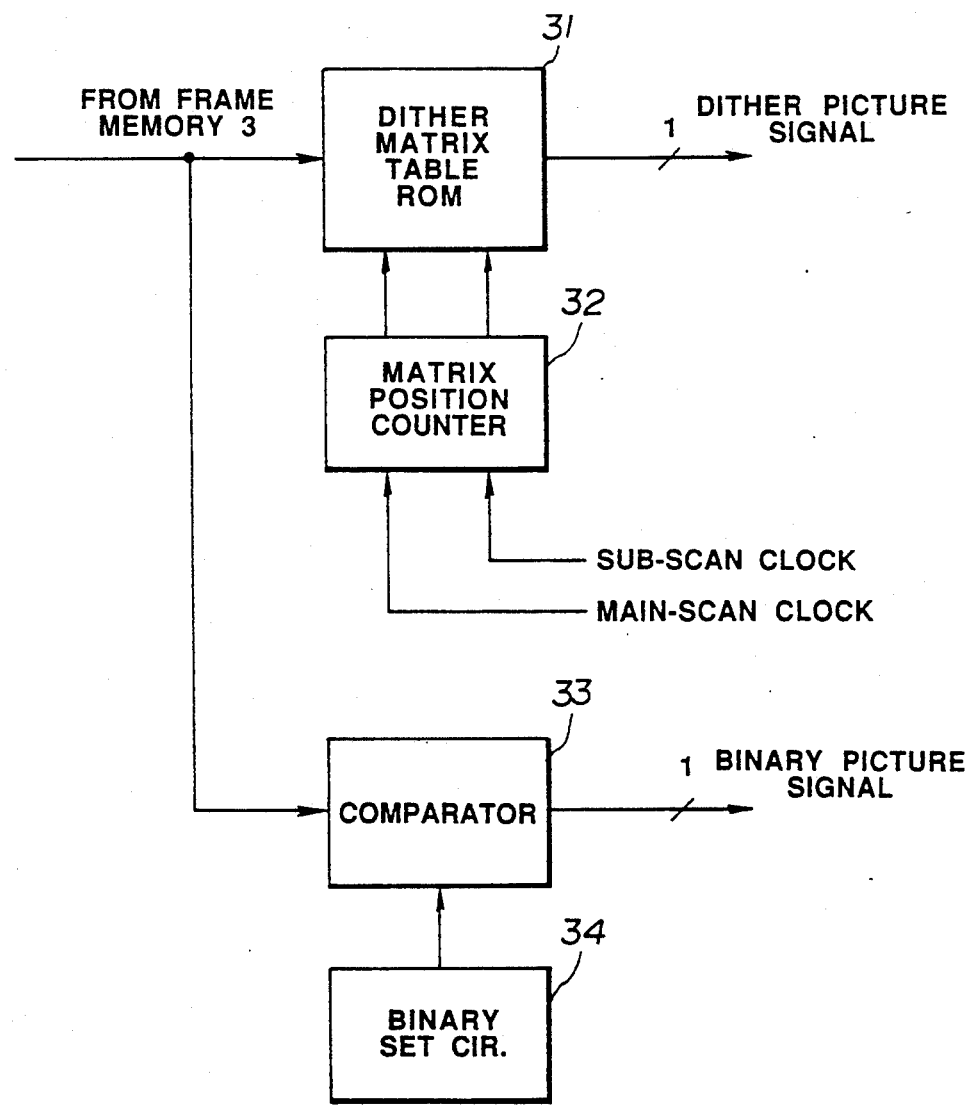
Figure 9:
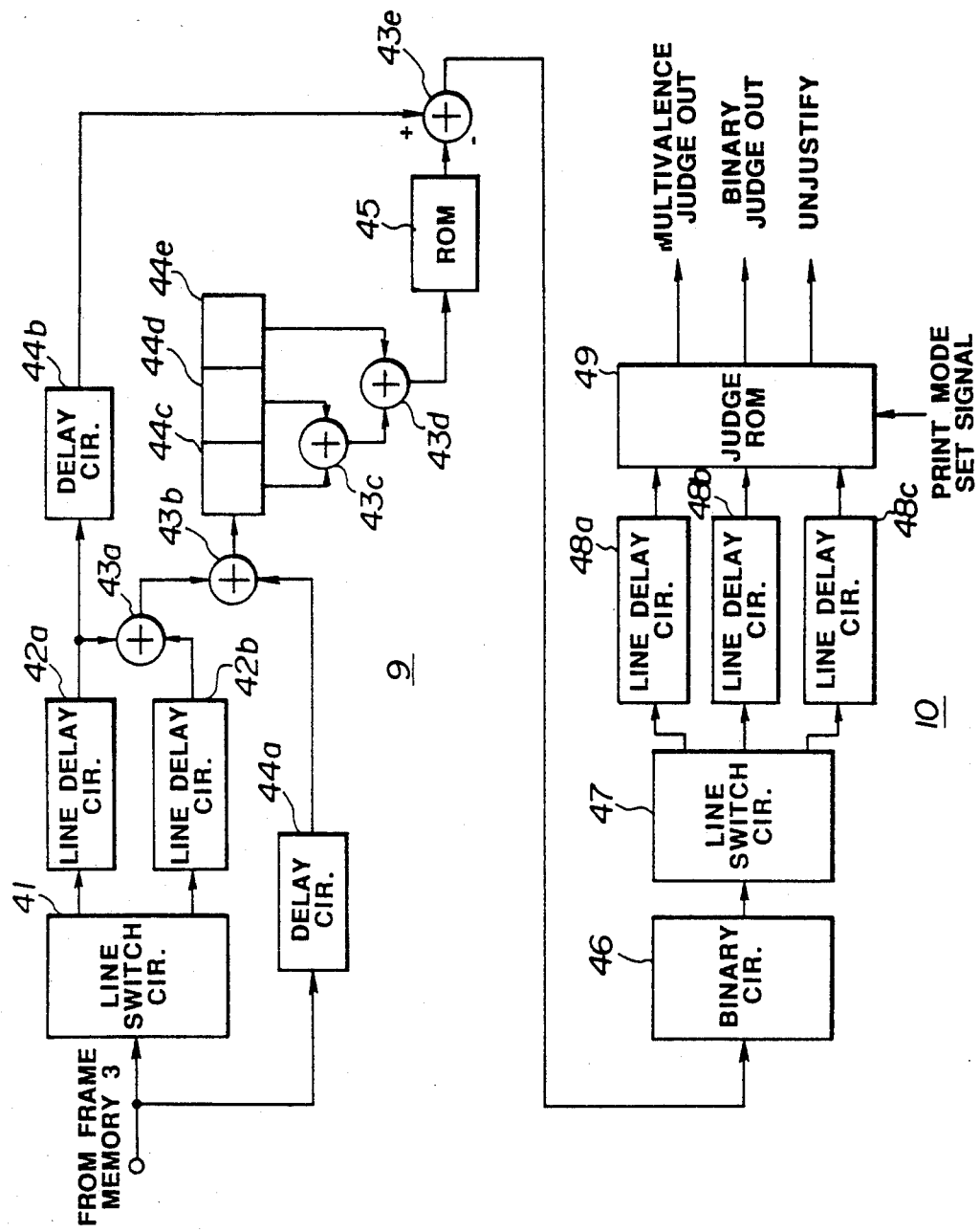
Figures 10, 11:
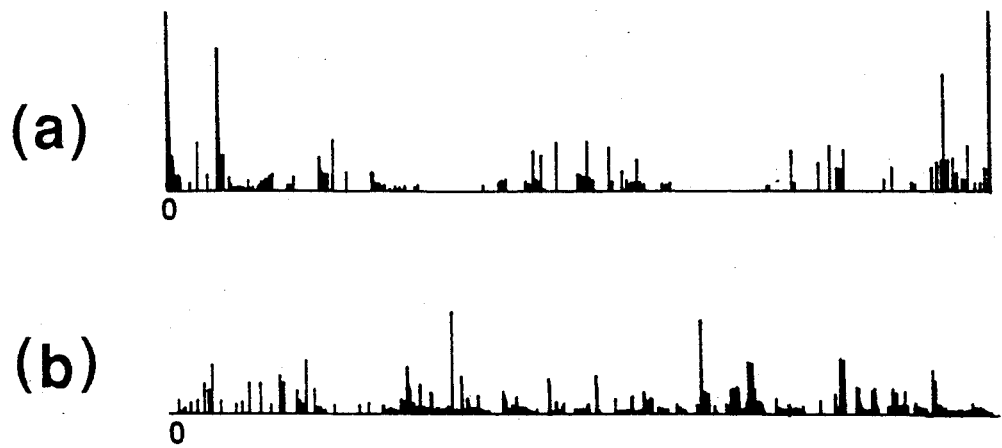
Figure 14:
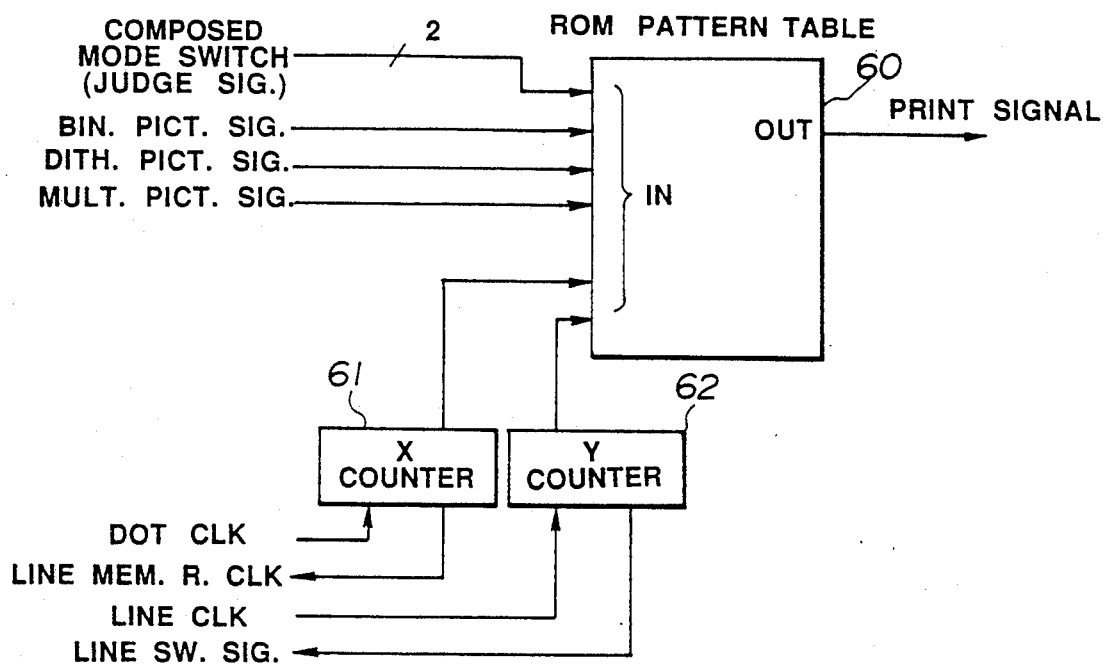
Figure 15:
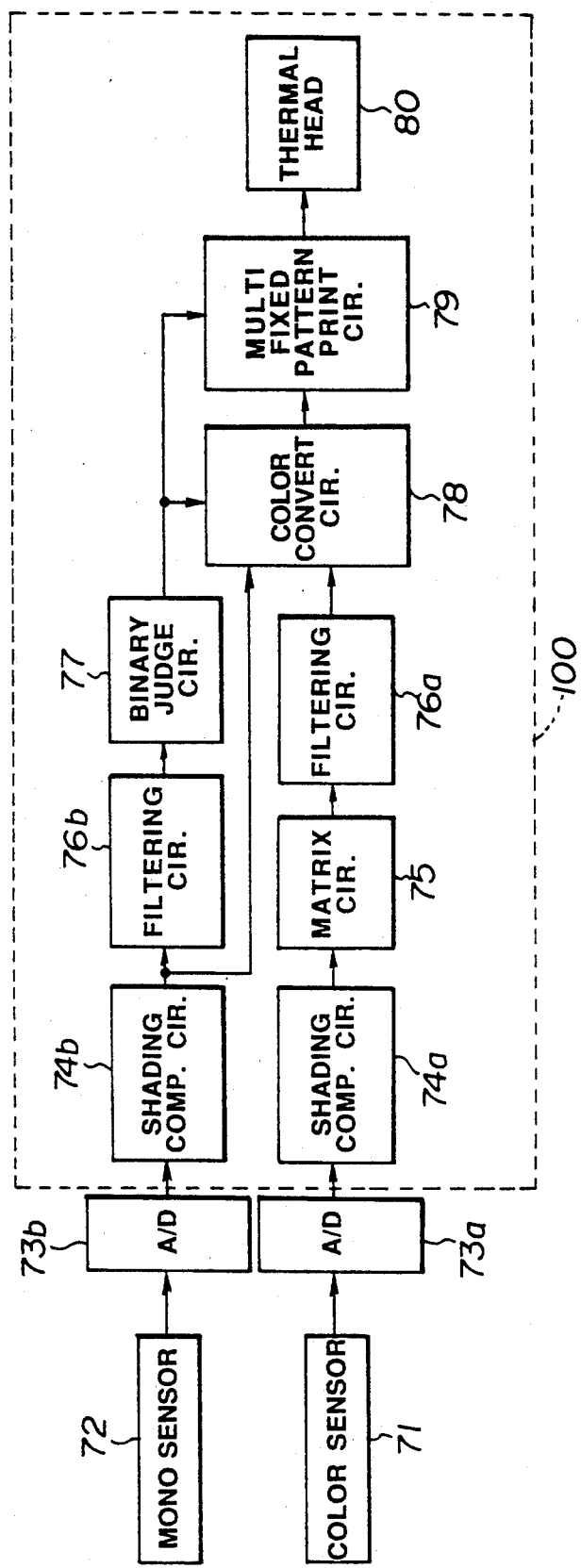
Figure 17:
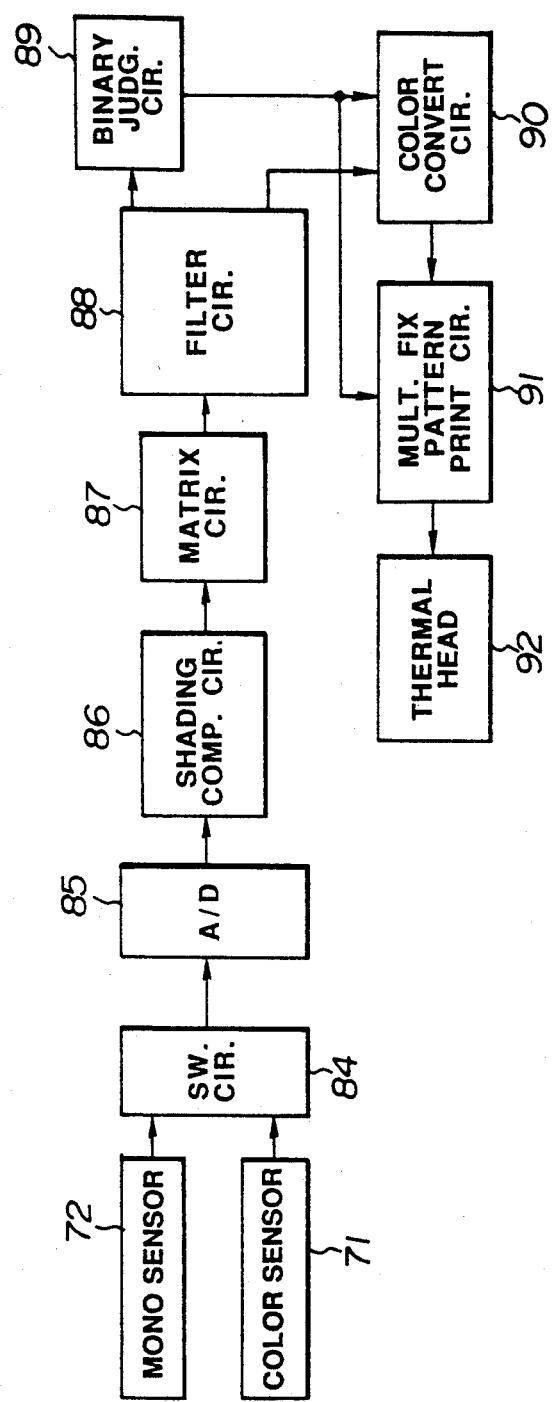

FIG. 1 to FIG. 4 show patterns of a prior art printing system;

FIG. 5 is a block diagram of an embodiment of the present invention;

FIG. 6 illustrates printing dot patterns of an embodiment of the present invention;

FIG. 7 is a time chart to explain the operation of the present invention;

FIGS. 8 and 9 are detailed block diagrams of the main portion of the embodiment of FIG. 5;

FIG. 10 is Laplacian signal analysis chart of the ROM 49 of FIG. 9;

FIG. 11 is a typical dot matrix pattern used in this invention;

FIGS. 12 and 13 show examples of dot print patterns of the invention;

FIG. 14 is a detailed block diagram of the main portion of the embodiment of FIG. 5;

FIG. 15 is a block diagram of the another embodiment of the present invention;

FIG. 16 shows the operation of the embodiment of FIG. 15;

FIG. 17 is a block diagram of a further embodiment of the present invention.

DETAILED DESCRIPTION OF THE PREFERRED EMBODIMENTS

As illustrated in FIG. 5, the apparatus of the present invention includes a CPU 1, used to control the whole unit, a print control circuit 15 and a timing circuit 16. A picture reader 2 generates picture signals by reading pictures (original pictures) including the halftone portions thereof. Picture signals are converted and output as multivalved digital signals (for example, expressed as 8 bits per picture element). A frame memory 3 stores the picture signals generated by the picture reader 2. The frame memory 3 is not required in case the picture read operation and printing output operation are not separated in terms of time.

The output of the frame memory 3 is input into a multivalved concentration pattern generation circuit 6 through an averaging circuit 4 and a line memory 5, and signals for multivalved picture printing are generated. That is the averaging circuit 4 is a circuit to carry out the averaging processing of M×M corresponding to M×N dots of the multivalved concentration pattern matrix size on the multivalved picture signal data from the frame memory 3. This averaged data is transferred one line at a time to the line memory 5 (portion of N lines before averaging). The multivalved concentration pattern generation circuit 6 generates signals for multivalved picture printing of the multivalved concentration patterns composed of matrices of M×N dots, employing the data in this portion of one line. These signals for multivalved picture printing enlarge the pattern size to M times in the main scanning direction, and to N times in the subscanning direction (N lines), respectively, against the multivalved picture signals input into the multivalved concentration pattern generation circuit 6. Therefore, averaged multivalved picture signals are supplied to the line memory 5 from the averaging circuit 4 one line at a time. The multivalved concentration pattern generation circuit 6 is controlled by a matrix address generation circuit 7.

A dither/binary circuit 8 carries out the dither processing and binary processing for picture signals output from the frame memory 3, and generates dither picture signals and binary picture signals.

The output signals of the frame memory 3 are applied to picture type judgement circuit 10 through a filter circuit 9. The picture type judgement circuit 10 determines whether the input picture is a multivalved picture or a binary picture. There are cases when this judgement cannot be made, and in such cases, the judgement circuit 10 outputs a different signal corresponding to this condition.

Figures 3, 4:
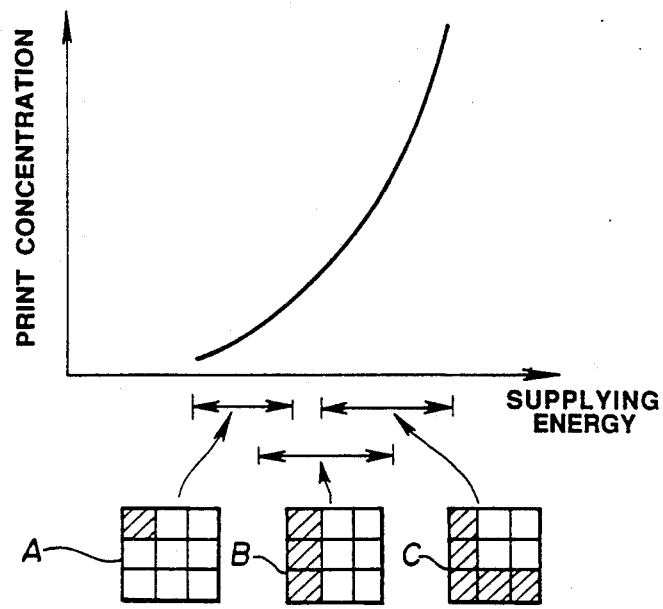

A multivalved, binary and dither switching circuit 11 switches the printing picture mode on the basis of the judgement result of the picture type judgement circuit 10. In case the judgement result of the judgement circuit 10 indicates a multivalve picture, signals for multivalved picture recording from the multivalved concentration pattern generation circuit 6 are output. Further, in case the judgement result indicates binary pictures, binary picture signals from the dither/binary circuit 8 are output after being individually modulated. Further, in case the judgement result is indefinite (no judgement), dither picture signals from the dither/binary circuit 8 are output after being modulated. The multivalved binary and dither switching circuit 11 carries out its switching dot by dot. FIG. 6 shows this aspect. FIG. 4 (a) shows the data of signals for multivalved picture printing, after conversion to multivalved concentration patterns in the multivalved concentration pattern generation circuit 6, and FIG. 6 (b) and FIG. 6 (c) show the data of dither pictures and binary pictures obtained in the dither/binary circuit 8, respectively. Further, FIG. 6 (d) is an example of the judgement output in the picture type judgement circuit 10. "A" shows the judgement result for multivalved pictures, "B" for indefinite (no judgement), and "C" for binary pictures, respectively. The multivalved, binary and dither switching circuit 11 switches printing output pictures in accordance with this judgement result, and this switching can be changed as shown in FIGS. 6 (e) and (f) whether binary pictures or multivalved concentration pictures are present.

A binary and dither picture concentration generation circuit 12 generates signals corresponding to the necessary printing energy (supplying energy of the thermal head) so that printed dots are of a proper size. The expressions ⑤ on the pattern shown in FIG. 6 correspond to the printing concentration of binary pictures.

Signals for multivalved picture printing thus output from the multivalved, binary and dither switching circuit 11 are supplied to a thermal head drive circuit 13. The thermal head drive circuit 13 converts the multivalved concentration patterns given by signals for multivalved picture printing to the pulse width of pulses to drive the thermal head in the thermal transfer printer 14. The drive circuit 13 also controls the supply of energy to the thermal head. The printing control circuit 15 controls the thermal transfer printer 14, and accurately carries out the transport, control, etc. of the ink ribbon, printing paper, etc. by the commands from the CPU 1. A timing circuit 16 generates synchronous signals of one line that are required in case the data of picture signals is transferred, and supplies the synchronous signals to the required circuit. For example, the timing circuit may act as a timing clock for data transfer.

FIG. 7 is a timing chart to show the operation of the present embodiment, and one cycle of the dot clock corresponds to the printing time of one dot by the thermal head. Multivalence picture signals are switched once in four cycles of dot clock. In the meantime, the multivalence concentration pattern generation circuit 6 is controlled by the matrix address generation circuit 7, and signals for multivalence picture printing of four dots are generated. On the other hand, binary picture signals and dither picture signals from the dither/binary circuit 8 are input as data corresponding to one dot, and the printing energy given to each dot of signals for multivalence picture printing is modulated by this binary picture signal. That is to say, among systems of signals for multivalence picture printing, the printing energy that binary picture signals and dither picture signals give to dots of "1" is demodulated, as shown in FIG. 6 (e) or (f), and finally the printing signal output 101 or 102, shown in FIG. 7, can be obtained.

In this way, it is possible to print mixed multivalent and binary pictures by the multivalence concentration pattern method and the binary method corresponding to one dot of thermal head per picture element.

The dither/binary circuit 8 carries out the dither application processing and binary application processing for picture signals from the frame memory 3 and generates dither picture signals and binary picture signals.

The specific configuration of the dither/binary circuit 8 is shown in FIG. 8. In FIG. 8, the multivalence picture signal data read from the frame memory 3 shown in FIG. 5 is input into a dither matrix table ROM 31 and a comparator 33. The ROM 31 is controlled by a matrix position counter 32 for matrix position setting. ROM 31 modulates the picture signal data input by dither patterns composed of M×N matrices, and outputs dither picture signals as data arrays of one bit. In addition, the M×N matrix size at the time of this dither application may be the same as the M×N of matrix size of multivalence concentration patterns. The comparator 33 receives the picture signal data from the frame memory 3 at the threshold level (binary application level). The threshold level is determined by the binary level setting circuit 34. Comparator 33 also outputs binary picture signals composed of data arrays of one bit. Further, it is also possible to vary the tone or concentration of the binary processing by changing the set level of the binary signal.

FIG. 9 shows in detail the configurations of filter circuit 9 and picture type judgement circuit 10. Three dot portions of the multivalence picture signal data from the frame memory 3 are added in the sub-scanning direction and three dot portions are added in the main scanning direction, totaling nine dot portions of a picture element. That is, the multivalence picture signal data in a portion of two lines is held by the line delay circuits 42a and 42b through the line switching circuit 41. These are added by the adder 43a, and this addition result and the multivalence picture data in the a portion of another line (output of the delay circuit 44a) are added by the adder 43b. The results for each of these additions are consecutively delayed by the delay circuits 44c to 44e, and the output of these delay circuits 44c to 44e is added by the adders 43c and 43d, resulting in a total value for each successive nine dot matrix series.

A mean value for each picture is read from the ROM 45 based upon the total added result for each successive nine dot matrix. The mean value added from the ROM 45 is the binary complement of 1/9 of the added result. A high-pass component of the original picture signal is used to judge the type of the picture. The highpass component is extracted by adding the averaged picture signal data (output of the ROM 45) and the original picture signal data (output of the delay circuit 44b) with the adder 43(e). The addition by the adder 43(e) is synchronized in accordance with the delay circuits 44(a) and 44(b).

The high-pass component of the averaged value of nine dot portions from the filter circuit 9 is input into the picture type judgement circuit 10. After being applied to the binary application circuit 46, the signal is consecutively delayed by the line delay circuits 48a to 48c through the line switching circuit 47. The data of nine dot portions, which includes data on three dots output from each of the line delay circuits 48a to 48c, is input into the judgement ROM 49, and the judgement of multivalence, binary or indefinite is carried out.

Next, the operation of the judgement ROM 49 is explained. Examination was made of the distribution of binary Laplacian and dot pictures. The results were obtained as shown in FIG. 10. In this Figure, the abscissa represents the arrangement of binary Laplacian signals in a matrix of 3×3 and the ordinate represents the frequency with which the arrangement of binary Laplacian signals occurs. The arrangement of binary Laplacian signals consists of nine bits of data whose MSB and LSB correspond to i11 and i33 in the 3×3 matrix shown in FIG. 11, respectively. For example, where only the binary Laplacian signal corresponding to i11 is 1, the nine bit data is given by "100000000". At the left end of the abscissa, all binary Laplacian signals for the 3×3 matrix are 0 and, at the right end thereof, all binary Laplacian signals are 1. As seen from the result shown in FIG. 10(a) in the case of character pictures, such patterns of binary Laplacian signals as shown in FIG. 12(a), (b) and (c) appear with a higher frequency. In this case, there is a tendency that not only white dots, but also black dots, are arranged side by side to some extent. This tendency coincides with the qualitative tendency of a character pattern.

On the other hand, the result shown in FIG. 11(b) typically is obtained with respect to dot pictures. As seen, such patterns of binary Laplacian signals as shown in FIGS. 13(a), 13(b) and 13(c) appear with a higher frequency. This indicates the qualitative tendency of dot pictures, where neither white dots nor black dots are normally continuously arranged but have a more periodic pattern. In FIGS. 12 and 13, shaded portions represent the binary Laplacian signal of "1" and unshaded portions represent the binary Laplacian signal of "0".

Accordingly, discrimination of the type of input pictures becomes possible by examining the magnitude of Laplacian signals and the distribution of binary Laplacian signals. For this reason, in the filter circuit 9, the Laplacian signals are binary encoded and the address signal indicating the distribution of binary Laplacian signals in the 3×3 pixel array is applied to the ROM 49.

The contents of the ROM 49 are determined by comparing the normal appearance frequencies of binary Laplacian signals for letter-like pictures and dot-like pictures, and for example, determining the difference between those frequencies. In cases where the appearance frequency for letter-like pictures is greater than for dot-like pictures, one pattern is assigned as a letter-like picture defined by the code "11". Where it is determined that the frequency for dot-like pictures is greater, the code "00" is assigned. When the difference does not exceed specified level, the pattern is assigned as a "no judgement" picture with a code "10" or "01". The code "10" is assigned when the appearance frequency of the binary Laplacian signal pattern for letter-like pictures is largest, and the code "01" is assigned when the dot-like picture frequency is largest.

Next, tables 1 to 8 show the binary Laplacian signal patterns in which the address numbers and the binary Laplacian signal patterns are indicated by "0" and "1" patterns, and the results of judgement (the contents of the ROM 49) are indicated by "0" (corresponding to above-mentioned code "00,") "1" (corresponding to above-mentioned code "01"), "2" (corresponding to above-mentioned code "10"), and "3" (corresponding to above-mentioned code "11"). Thus, the code "0" expresses the multivalence picture, "3" expresses the binary picture and "1" or "2" express the "no judgement" picture.

TABLE 1

| ADDRESS → | 0 | 1 | 2 | 3 | 4 | 5 | 6 | 7 |
|---|---|---|---|---|---|---|---|---|
| LAPLACIAN PATTERN → | 000 000 000 | 000 000 001 | 000 000 010 | 000 000 011 | 000 000 100 | 000 000 101 | 000 000 110 | 000 000 111 |
| RESULT of JUDGEMENT → | 3 | 1 | 1 | 3 | 1 | 2 | 3 | 3 |

| | 8 | 9 | 10 | 11 | 12 | 13 | 14 | 15 |
|---|---|---|---|---|---|---|---|---|
| | 000 001 000 | 000 001 001 | 000 001 010 | 000 001 011 | 000 001 100 | 000 001 101 | 000 001 110 | 000 001 111 |
| | 1 | 3 | 0 | 2 | 0 | 1 | 0 | 3 |

| | 16 | 17 | 18 | 19 | 20 | 21 | 22 | 23 |
|---|---|---|---|---|---|---|---|---|
| | 000 010 000 | 000 010 010 | 000 010 010 | 000 010 011 | 000 010 100 | 000 010 101 | 000 010 110 | 000 010 111 |
| | 1 | 1 | 0 | 0 | 1 | 0 | 0 | 2 |

| | 24 | 25 | 26 | 27 | 28 | 29 | 30 | 31 |
|---|---|---|---|---|---|---|---|---|
| | 000 011 000 | 000 011 001 | 000 011 010 | 000 011 011 | 000 011 100 | 000 011 101 | 000 011 110 | 000 011 111 |
| | 0 | 0 | 0 | 2 | 0 | 0 | 0 | 3 |

| | 32 | 33 | 34 | 35 | 36 | 37 | 38 | 39 |
|---|---|---|---|---|---|---|---|---|
| | 000 100 000 | 000 100 001 | 000 100 010 | 000 100 011 | 000 100 100 | 000 100 101 | 000 100 110 | 000 100 111 |
| | 1 | 0 | 0 | 0 | 3 | 1 | 2 | 3 |

| | 40 | 41 | 42 | 43 | 44 | 45 | 46 | 47 |
|---|---|---|---|---|---|---|---|---|
| | 000 101 000 | 000 101 001 | 000 101 010 | 000 101 011 | 000 101 100 | 000 101 101 | 000 101 110 | 000 101 111 |
| | 1 | 1 | 1 | 1 | 1 | 1 | 0 | 3 |

| | 48 | 49 | 50 | 51 | 52 | 53 | 54 | 55 |
|---|---|---|---|---|---|---|---|---|
| | 000 110 000 | 000 110 001 | 000 110 010 | 000 110 011 | 000 110 100 | 000 110 101 | 000 110 110 | 000 110 111 |
| | 0 | 0 | 0 | 0 | 0 | 0 | 2 | 3 |

| | 56 | 57 | 58 | 59 | 60 | 61 | 62 | 63 |
|---|---|---|---|---|---|---|---|---|
| | 000 111 000 | 000 111 001 | 000 111 010 | 000 111 011 | 000 111 100 | 000 111 101 | 000 111 110 | 000 111 111 |
| | 2 | 1 | 0 | 2 | 1 | 2 | 2 | 3 |

TABLE 2

| 64 | 65 | 66 | 67 | 68 | 69 | 70 | 71 |
|---|---|---|---|---|---|---|---|
| 001 000 000 | 001 000 001 | 001 000 010 | 001 000 011 | 001 000 100 | 001 000 101 | 001 000 110 | 001 000 111 |
| 1 | 3 | 0 | 1 | 1 | 1 | 0 | 1 |

| 72 | 73 | 74 | 75 | 76 | 77 | 78 | 79 |
|---|---|---|---|---|---|---|---|
| 001 001 000 | 001 001 001 | 001 001 010 | 001 001 011 | 001 001 100 | 001 001 101 | 001 001 110 | 001 001 111 |
| 3 | 3 | 0 | 3 | 0 | 1 | 0 | 2 |

TABLE 2-continued

| 80 | 81 | 82 | 83 | 84 | 85 | 86 | 87 |
|---|---|---|---|---|---|---|---|
| 0 0 1 | 0 0 1 | 0 0 1 | 0 0 1 | 0 0 1 | 0 0 1 | 0 0 1 | 0 0 1 |
| 0 1 0 | 0 1 0 | 0 1 0 | 0 1 0 | 0 1 0 | 0 1 0 | 0 1 0 | 0 1 0 |
| 0 0 0 | 0 0 1 | 0 1 0 | 0 1 1 | 1 0 0 | 1 0 1 | 1 1 0 | 1 1 1 |
| 1 | 1 | 0 | 0 | 0 | 0 | 0 | 0 |

| 88 | 89 | 90 | 91 | 92 | 93 | 94 | 95 |
|---|---|---|---|---|---|---|---|
| 0 0 1 | 0 0 1 | 0 0 1 | 0 0 1 | 0 0 1 | 0 0 1 | 0 0 1 | 0 0 1 |
| 0 1 1 | 0 1 1 | 0 1 1 | 0 1 1 | 0 1 1 | 0 1 1 | 0 1 1 | 0 1 1 |
| 0 0 0 | 0 0 1 | 0 1 0 | 0 1 1 | 1 0 0 | 1 0 1 | 1 1 0 | 1 1 1 |
| 0 | 2 | 0 | 3 | 0 | 0 | 1 | 2 |

| 96 | 97 | 98 | 99 | 100 | 101 | 102 | 103 |
|---|---|---|---|---|---|---|---|
| 0 0 1 | 0 0 1 | 0 0 1 | 0 0 1 | 0 0 1 | 0 0 1 | 0 0 1 | 0 0 1 |
| 1 0 0 | 1 0 0 | 1 0 0 | 1 0 0 | 1 0 0 | 1 0 0 | 1 0 0 | 1 0 0 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 0 |

| 104 | 105 | 106 | 107 | 108 | 109 | 110 | 111 |
|---|---|---|---|---|---|---|---|
| 0 0 1 | 0 0 1 | 0 0 1 | 0 0 1 | 0 0 1 | 0 0 1 | 0 0 1 | 0 0 1 |
| 1 0 1 | 1 0 1 | 1 0 1 | 1 0 1 | 1 0 1 | 1 0 1 | 1 0 1 | 1 0 1 |
| 0 0 0 | 0 0 1 | 0 1 0 | 0 1 1 | 1 0 0 | 1 0 1 | 1 1 0 | 1 1 1 |
| 0 | 1 | 0 | 1 | 0 | 0 | 0 | 1 |

| 112 | 113 | 114 | 115 | 116 | 117 | 118 | 119 |
|---|---|---|---|---|---|---|---|
| 0 0 1 | 0 0 1 | 0 0 1 | 0 0 1 | 0 0 1 | 0 0 1 | 0 0 1 | 0 0 1 |
| 1 1 0 | 1 1 0 | 1 1 0 | 1 1 0 | 1 1 0 | 1 1 0 | 1 1 0 | 1 1 0 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 0 |

| 120 | 121 | 122 | 123 | 124 | 125 | 126 | 127 |
|---|---|---|---|---|---|---|---|
| 0 0 1 | 0 0 1 | 0 0 1 | 0 0 1 | 0 0 1 | 0 0 1 | 0 0 1 | 0 0 1 |
| 1 1 1 | 1 1 1 | 1 1 1 | 1 1 1 | 1 1 1 | 1 1 1 | 1 1 1 | 1 1 1 |
| 0 0 0 | 0 0 1 | 0 1 0 | 0 1 1 | 1 0 0 | 1 0 1 | 1 1 0 | 1 1 1 |
| 1 | 1 | 0 | 2 | 0 | 1 | 2 | 3 |

TABLE 3

| 128 | 129 | 130 | 131 | 132 | 133 | 134 | 135 |
|---|---|---|---|---|---|---|---|
| 0 1 0 | 0 1 0 | 0 1 0 | 0 1 0 | 0 1 0 | 0 1 0 | 0 1 0 | 0 1 0 |
| 0 0 0 | 0 0 0 | 0 0 0 | 0 0 0 | 0 0 0 | 0 0 0 | 0 0 0 | 0 0 0 |
| 0 0 0 | 0 0 1 | 0 1 0 | 0 1 1 | 1 0 0 | 1 0 1 | 1 1 0 | 1 1 1 |
| 1 | 0 | 1 | 0 | 0 | 0 | 0 | 1 |

| 136 | 137 | 138 | 139 | 140 | 141 | 142 | 143 |
|---|---|---|---|---|---|---|---|
| 0 1 0 | 0 1 0 | 0 1 0 | 0 1 0 | 0 1 0 | 0 1 0 | 0 1 0 | 0 1 0 |
| 0 0 1 | 0 0 1 | 0 0 1 | 0 0 1 | 0 0 1 | 0 0 1 | 0 0 1 | 0 0 1 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 1 |

| 144 | 145 | 146 | 147 | 148 | 149 | 150 | 151 |
|---|---|---|---|---|---|---|---|
| 0 1 0 | 0 1 0 | 0 1 0 | 0 1 0 | 0 1 0 | 0 1 0 | 0 1 0 | 0 1 0 |
| 0 1 0 | 0 1 0 | 0 1 0 | 0 1 0 | 0 1 0 | 0 1 0 | 0 1 0 | 0 1 0 |
| 0 0 0 | 0 0 1 | 0 1 0 | 0 1 1 | 1 0 0 | 1 0 1 | 1 1 0 | 1 1 1 |
| 0 | 0 | 2 | 1 | 0 | 0 | 1 | 0 |

| 152 | 153 | 154 | 155 | 156 | 157 | 158 | 159 |
|---|---|---|---|---|---|---|---|
| 0 1 0 | 0 1 0 | 0 1 0 | 0 1 0 | 0 1 0 | 0 1 0 | 0 1 0 | 0 1 0 |
| 0 1 1 | 0 1 1 | 0 1 1 | 0 1 1 | 0 1 1 | 0 1 1 | 0 1 1 | 0 1 1 |
| 0 0 0 | 0 0 1 | 0 1 0 | 0 1 1 | 1 0 0 | 1 0 1 | 1 1 0 | 1 1 1 |
| 0 | 0 | 0 | 2 | 0 | 0 | 0 | 2 |

| 160 | 161 | 162 | 163 | 164 | 165 | 166 | 167 |
|---|---|---|---|---|---|---|---|
| 0 1 0 | 0 1 0 | 0 1 0 | 0 1 0 | 0 1 0 | 0 1 0 | 0 1 0 | 0 1 0 |
| 1 0 0 | 1 0 0 | 1 0 0 | 1 0 0 | 1 0 0 | 1 0 0 | 1 0 0 | 1 0 0 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 1 |

| 168 | 169 | 170 | 171 | 172 | 173 | 174 | 175 |
|---|---|---|---|---|---|---|---|
| 0 1 0 | 0 1 0 | 0 1 0 | 0 1 0 | 0 1 0 | 0 1 0 | 0 1 0 | 0 1 0 |
| 1 0 1 | 1 0 1 | 1 0 1 | 1 0 1 | 1 0 1 | 1 0 1 | 1 0 1 | 1 0 1 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 1 |

TABLE 3-continued

| 176 | 177 | 178 | 179 | 180 | 181 | 182 | 183 |
|---|---|---|---|---|---|---|---|
| 0 1 0 | 0 1 0 | 0 1 0 | 0 1 0 | 0 1 0 | 0 1 0 | 0 1 0 | 0 1 0 |
| 1 1 0 | 1 1 0 | 1 1 0 | 1 1 0 | 1 1 0 | 1 1 0 | 1 1 0 | 1 1 0 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 2 | 2 |

| 184 | 185 | 186 | 187 | 188 | 189 | 190 | 191 |
|---|---|---|---|---|---|---|---|
| 0 1 0 | 0 1 0 | 0 1 0 | 0 1 0 | 0 1 0 | 0 1 0 | 0 1 0 | 0 1 0 |
| 1 1 1 | 1 1 1 | 1 1 1 | 1 1 1 | 1 1 1 | 1 1 1 | 1 1 1 | 1 1 1 |
| 0 0 0 | 0 0 1 | 0 1 0 | 0 1 1 | 1 0 0 | 1 0 1 | 1 1 0 | 1 1 1 |
| 0 | 0 | 0 | 3 | 0 | 0 | 3 | 3 |

TABLE 4

| 192 | 193 | 194 | 195 | 196 | 197 | 198 | 199 |
|---|---|---|---|---|---|---|---|
| 0 1 1 | 0 1 1 | 0 1 1 | 0 1 1 | 0 1 1 | 0 1 1 | 0 1 1 | 0 1 1 |
| 0 0 0 | 0 0 0 | 0 0 0 | 0 0 0 | 0 0 0 | 0 0 0 | 0 0 0 | 0 0 0 |
| 0 0 0 | 0 0 1 | 0 1 0 | 0 1 1 | 1 0 0 | 1 0 1 | 1 1 0 | 1 1 1 |
| 3 | 1 | 0 | 1 | 0 | 0 | 0 | 0 |

| 200 | 201 | 202 | 203 | 204 | 205 | 206 | 207 |
|---|---|---|---|---|---|---|---|
| 0 1 1 | 0 1 1 | 0 1 1 | 0 1 1 | 0 1 1 | 0 1 1 | 0 1 1 | 0 1 1 |
| 0 0 1 | 0 0 1 | 0 0 1 | 0 0 1 | 0 0 1 | 0 0 1 | 0 0 1 | 0 0 1 |
| 0 0 0 | 0 0 1 | 0 1 0 | 0 1 1 | 1 0 0 | 1 0 1 | 1 1 0 | 1 1 1 |
| 2 | 3 | 0 | 3 | 0 | 0 | 0 | 1 |

| 208 | 209 | 210 | 211 | 212 | 213 | 214 | 215 |
|---|---|---|---|---|---|---|---|
| 0 1 1 | 0 1 1 | 0 1 1 | 0 1 1 | 0 1 1 | 0 1 1 | 0 1 1 | 0 1 1 |
| 0 1 0 | 0 1 0 | 0 1 0 | 0 1 0 | 0 1 0 | 0 1 0 | 0 1 0 | 0 1 0 |
| 0 0 0 | 0 0 1 | 0 1 0 | 0 1 1 | 1 0 0 | 1 0 1 | 1 1 0 | 1 1 1 |
| 0 | 0 | 1 | 2 | 0 | 0 | 0 | 1 |

| 216 | 217 | 218 | 219 | 220 | 221 | 222 | 223 |
|---|---|---|---|---|---|---|---|
| 0 1 1 | 0 1 1 | 0 1 1 | 0 1 1 | 0 1 1 | 0 1 1 | 0 1 1 | 0 1 1 |
| 0 1 1 | 0 1 1 | 0 1 1 | 0 1 1 | 0 1 1 | 0 1 1 | 0 1 1 | 0 1 1 |
| 0 0 0 | 0 0 1 | 0 1 0 | 0 1 1 | 1 0 0 | 1 0 1 | 1 1 0 | 1 1 1 |
| 2 | 3 | 2 | 3 | 0 | 0 | 2 | 3 |

| 224 | 225 | 226 | 227 | 228 | 229 | 230 | 231 |
|---|---|---|---|---|---|---|---|
| 0 1 1 | 0 1 1 | 0 1 1 | 0 1 1 | 0 1 1 | 0 1 1 | 0 1 1 | 0 1 1 |
| 1 0 0 | 1 0 0 | 1 0 0 | 1 0 0 | 1 0 0 | 1 0 0 | 1 0 0 | 1 0 0 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 0 |

| 232 | 233 | 234 | 235 | 236 | 237 | 238 | 239 |
|---|---|---|---|---|---|---|---|
| 0 1 1 | 0 1 1 | 0 1 1 | 0 1 1 | 0 1 1 | 0 1 1 | 0 1 1 | 0 1 1 |
| 1 0 1 | 1 0 1 | 1 0 1 | 1 0 1 | 1 0 1 | 1 0 1 | 1 0 1 | 1 0 1 |
| 0 0 0 | 0 0 1 | 0 1 0 | 0 1 1 | 1 0 0 | 1 0 1 | 1 1 0 | 1 1 1 |
| 0 | 1 | 0 | 2 | 0 | 0 | 0 | 2 |

| 240 | 241 | 242 | 243 | 244 | 245 | 246 | 247 |
|---|---|---|---|---|---|---|---|
| 0 1 1 | 0 1 1 | 0 1 1 | 0 1 1 | 0 1 1 | 0 1 1 | 0 1 1 | 0 1 1 |
| 1 1 0 | 1 1 0 | 1 1 0 | 1 1 0 | 1 1 0 | 1 1 0 | 1 1 0 | 1 1 0 |
| 0 0 0 | 0 0 1 | 0 1 0 | 0 1 1 | 1 0 0 | 1 0 1 | 1 1 0 | 1 1 1 |
| 0 | 0 | 0 | 0 | 1 | 0 | 2 | 2 |

| 248 | 249 | 250 | 251 | 252 | 253 | 254 | 255 |
|---|---|---|---|---|---|---|---|
| 0 1 1 | 0 1 1 | 0 1 1 | 0 1 1 | 0 1 1 | 0 1 1 | 0 1 1 | 0 1 1 |
| 1 1 1 | 1 1 1 | 1 1 1 | 1 1 1 | 1 1 1 | 1 1 1 | 1 1 1 | 1 1 1 |
| 0 0 0 | 0 0 1 | 0 1 0 | 0 1 1 | 1 0 0 | 1 0 1 | 1 1 0 | 1 1 1 |
| 2 | 2 | 3 | 3 | 2 | 2 | 3 | 3 |

TABLE 5

| 256 | 257 | 258 | 259 | 260 | 261 | 262 | 263 |
|---|---|---|---|---|---|---|---|
| 1 0 0 | 1 0 0 | 1 0 0 | 1 0 0 | 1 0 0 | 1 0 0 | 1 0 0 | 1 0 0 |
| 0 0 0 | 0 0 0 | 0 0 0 | 0 0 0 | 0 0 0 | 0 0 0 | 0 0 0 | 0 0 0 |
| 0 0 0 | 0 0 1 | 0 1 0 | 0 1 1 | 1 0 0 | 1 0 1 | 1 1 0 | 1 1 1 |
| 1 | 1 | 0 | 0 | 3 | 1 | 1 | 1 |

TABLE 5-continued

| 264 | 265 | 266 | 267 | 268 | 269 | 270 | 271 |
|---|---|---|---|---|---|---|---|
| 1 0 0 | 1 0 0 | 1 0 0 | 1 0 0 | 1 0 0 | 1 0 0 | 1 0 0 | 1 0 0 |
| 0 0 1 | 0 0 1 | 0 0 1 | 0 0 1 | 0 0 1 | 0 0 1 | 0 0 1 | 0 0 1 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 0 |

| 272 | 273 | 274 | 275 | 276 | 277 | 278 | 279 |
|---|---|---|---|---|---|---|---|
| 1 0 0 | 1 0 0 | 1 0 0 | 1 0 0 | 1 0 0 | 1 0 0 | 1 0 0 | 1 0 0 |
| 0 1 0 | 0 1 0 | 0 1 0 | 0 1 0 | 0 1 0 | 0 1 0 | 0 1 0 | 0 1 0 |
| 0 0 0 | 0 0 1 | 0 1 0 | 0 1 1 | 1 0 0 | 1 0 1 | 1 1 0 | 1 1 1 |
| 1 | 0 | 0 | 0 | 1 | 0 | 0 | 0 |

| 280 | 281 | 282 | 283 | 284 | 285 | 286 | 287 |
|---|---|---|---|---|---|---|---|
| 1 0 0 | 1 0 0 | 1 0 0 | 1 0 0 | 1 0 0 | 1 0 0 | 1 0 0 | 1 0 0 |
| 0 1 1 | 0 1 1 | 0 1 1 | 0 1 1 | 0 1 1 | 0 1 1 | 0 1 1 | 0 1 1 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 0 |

| 288 | 289 | 290 | 291 | 292 | 293 | 294 | 295 |
|---|---|---|---|---|---|---|---|
| 1 0 0 | 1 0 0 | 1 0 0 | 1 0 0 | 1 0 0 | 1 0 0 | 1 0 0 | 1 0 0 |
| 1 0 0 | 1 0 0 | 1 0 0 | 1 0 0 | 1 0 0 | 1 0 0 | 1 0 0 | 1 0 0 |
| 0 0 0 | 0 0 1 | 0 1 0 | 0 1 1 | 1 0 0 | 1 0 1 | 1 1 0 | 1 1 1 |
| 3 | 0 | 0 | 0 | 3 | 1 | 3 | 2 |

| 296 | 297 | 298 | 299 | 300 | 301 | 302 | 303 |
|---|---|---|---|---|---|---|---|
| 1 0 0 | 1 0 0 | 1 0 0 | 1 0 0 | 1 0 0 | 1 0 0 | 1 0 0 | 1 0 0 |
| 1 0 1 | 1 0 1 | 1 0 1 | 1 0 1 | 1 0 1 | 1 0 1 | 1 0 1 | 1 0 1 |
| 0 0 0 | 0 0 1 | 0 1 0 | 0 1 1 | 1 0 0 | 1 0 1 | 1 1 0 | 1 1 1 |
| 0 | 0 | 0 | 1 | 0 | 0 | 1 | 1 |

| 304 | 305 | 306 | 307 | 308 | 309 | 310 | 311 |
|---|---|---|---|---|---|---|---|
| 1 0 0 | 1 0 0 | 1 0 0 | 1 0 0 | 1 0 0 | 1 0 0 | 1 0 0 | 1 0 0 |
| 1 1 0 | 1 1 0 | 1 1 0 | 1 1 0 | 1 1 0 | 1 1 0 | 1 1 0 | 1 1 0 |
| 0 0 0 | 0 0 1 | 0 1 0 | 0 1 1 | 1 0 0 | 1 0 1 | 1 1 0 | 1 1 1 |
| 0 | 0 | 0 | 1 | 2 | 0 | 3 | 3 |

| 312 | 313 | 314 | 315 | 316 | 317 | 318 | 319 |
|---|---|---|---|---|---|---|---|
| 1 0 0 | 1 0 0 | 1 0 0 | 1 0 0 | 1 0 0 | 1 0 0 | 1 0 0 | 1 0 0 |
| 1 1 1 | 1 1 1 | 1 1 1 | 1 1 1 | 1 1 1 | 1 1 1 | 1 1 1 | 1 1 1 |
| 0 0 0 | 0 0 1 | 0 1 0 | 0 1 1 | 1 0 0 | 1 0 1 | 1 1 0 | 1 1 1 |
| 1 | 0 | 0 | 2 | 1 | 1 | 2 | 3 |

TABLE 6

| 320 | 321 | 322 | 323 | 324 | 325 | 326 | 327 |
|---|---|---|---|---|---|---|---|
| 1 0 1 | 1 0 1 | 1 0 1 | 1 0 1 | 1 0 1 | 1 0 1 | 1 0 1 | 1 0 1 |
| 0 0 0 | 0 0 0 | 0 0 0 | 0 0 0 | 0 0 0 | 0 0 0 | 0 0 0 | 0 0 0 |
| 0 0 0 | 0 0 1 | 0 1 0 | 0 1 1 | 1 0 0 | 1 0 1 | 1 1 0 | 1 1 1 |
| 2 | 1 | 0 | 0 | 1 | 0 | 0 | 0 |

| 328 | 329 | 330 | 331 | 332 | 333 | 334 | 335 |
|---|---|---|---|---|---|---|---|
| 1 0 1 | 1 0 1 | 1 0 1 | 1 0 1 | 1 0 1 | 1 0 1 | 1 0 1 | 1 0 1 |
| 0 0 1 | 0 0 1 | 0 0 1 | 0 0 1 | 0 0 1 | 0 0 1 | 0 0 1 | 0 0 1 |
| 0 0 0 | 0 0 1 | 0 1 0 | 0 1 1 | 1 0 0 | 1 0 1 | 1 1 0 | 1 1 1 |
| 1 | 1 | 0 | 0 | 0 | 0 | 0 | 0 |

| 336 | 337 | 338 | 339 | 340 | 341 | 342 | 343 |
|---|---|---|---|---|---|---|---|
| 1 0 1 | 1 0 1 | 1 0 1 | 1 0 1 | 1 0 1 | 1 0 1 | 1 0 1 | 1 0 1 |
| 0 1 0 | 0 1 0 | 0 1 0 | 0 1 0 | 0 1 0 | 0 1 0 | 0 1 0 | 0 1 0 |
| 0 0 0 | 0 0 1 | 0 1 0 | 0 1 1 | 1 0 0 | 1 0 1 | 1 1 0 | 1 1 1 |
| 1 | 0 | 0 | 0 | 0 | 0 | 0 | 0 |

| 344 | 345 | 346 | 347 | 348 | 349 | 350 | 351 |
|---|---|---|---|---|---|---|---|
| 1 0 1 | 1 0 1 | 1 0 1 | 1 0 1 | 1 0 1 | 1 0 1 | 1 0 1 | 1 0 1 |
| 0 1 1 | 0 1 1 | 0 1 1 | 0 1 1 | 0 1 1 | 0 1 1 | 0 1 1 | 0 1 1 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 1 |

| 352 | 353 | 354 | 355 | 356 | 357 | 358 | 359 |
|---|---|---|---|---|---|---|---|
| 1 0 1 | 1 0 1 | 1 0 1 | 1 0 1 | 1 0 1 | 1 0 1 | 1 0 1 | 1 0 1 |
| 1 1 1 | 1 0 0 | 1 0 0 | 1 0 0 | 1 0 0 | 1 0 0 | 1 0 0 | 1 0 0 |
| 0 0 0 | 0 0 1 | 0 1 0 | 0 1 1 | 1 0 0 | 1 0 1 | 1 1 0 | 1 1 1 |
| 1 | 0 | 0 | 0 | 1 | 0 | 0 | 0 |

TABLE 6-continued

| 360 | 361 | 362 | 363 | 364 | 365 | 366 | 367 |
|---|---|---|---|---|---|---|---|
| 1 0 1 | 1 0 1 | 1 0 1 | 1 0 1 | 1 0 1 | 1 0 1 | 1 0 1 | 1 0 1 |
| 1 0 1 | 1 0 1 | 1 0 1 | 1 0 1 | 1 0 1 | 1 0 1 | 1 0 1 | 1 0 1 |
| 0 0 0 | 0 0 1 | 0 1 0 | 0 1 1 | 1 0 0 | 1 0 1 | 1 1 0 | 1 1 1 |
| 1 | 0 | 0 | 1 | 0 | 0 | 0 | 0 |

| 368 | 369 | 370 | 371 | 372 | 373 | 374 | 375 |
|---|---|---|---|---|---|---|---|
| 1 0 1 | 1 0 1 | 1 0 1 | 1 0 1 | 1 0 1 | 1 0 1 | 1 0 1 | 1 0 1 |
| 1 1 0 | 1 1 0 | 1 1 0 | 1 1 0 | 1 1 0 | 1 1 0 | 1 1 0 | 1 1 0 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 1 |

| 376 | 377 | 378 | 379 | 380 | 381 | 382 | 383 |
|---|---|---|---|---|---|---|---|
| 1 0 1 | 1 0 1 | 1 0 1 | 1 0 1 | 1 0 1 | 1 0 1 | 1 0 1 | 1 0 1 |
| 1 1 1 | 1 1 1 | 1 1 1 | 1 1 1 | 1 1 1 | 1 1 1 | 1 1 1 | 1 1 1 |
| 0 0 0 | 0 0 1 | 0 1 0 | 0 1 1 | 1 0 0 | 1 0 1 | 1 1 0 | 1 1 1 |
| 2 | 1 | 0 | 2 | 1 | 1 | 2 | 3 |

TABLE 7

| 384 | 385 | 386 | 387 | 388 | 389 | 390 | 391 |
|---|---|---|---|---|---|---|---|
| 1 1 0 | 1 1 0 | 1 1 0 | 1 1 0 | 1 1 0 | 1 1 0 | 1 1 0 | 1 1 0 |
| 0 0 0 | 0 0 0 | 0 0 0 | 0 0 0 | 0 0 0 | 0 0 0 | 0 0 0 | 0 0 0 |
| 0 0 0 | 0 0 1 | 0 1 0 | 0 1 1 | 1 0 0 | 1 0 1 | 1 1 0 | 1 1 1 |
| 3 | 0 | 0 | 0 | 1 | 0 | 1 | 0 |

| 392 | 393 | 394 | 395 | 396 | 397 | 398 | 399 |
|---|---|---|---|---|---|---|---|
| 1 1 0 | 1 1 0 | 1 1 0 | 1 1 0 | 1 1 0 | 1 1 0 | 1 1 0 | 1 1 0 |
| 0 0 1 | 0 0 1 | 0 0 1 | 0 0 1 | 0 0 1 | 0 0 1 | 0 0 1 | 0 0 1 |
| 0 0 0 | 0 0 1 | 0 1 0 | 0 1 1 | 1 0 0 | 1 0 1 | 1 1 0 | 1 1 1 |
| 0 | 0 | 0 | 0 | 0 | 0 | 0 | 0 |

| 400 | 401 | 402 | 403 | 404 | 405 | 406 | 407 |
|---|---|---|---|---|---|---|---|
| 1 1 0 | 1 1 0 | 1 1 0 | 1 1 0 | 1 1 0 | 1 1 0 | 1 1 0 | 1 1 0 |
| 0 1 0 | 0 1 0 | 0 1 0 | 0 1 0 | 0 1 0 | 0 1 0 | 0 1 0 | 0 1 0 |
| 0 0 0 | 0 0 1 | 0 1 0 | 0 1 1 | 1 0 0 | 1 0 1 | 1 1 0 | 1 1 1 |
| 0 | 0 | 1 | 0 | 0 | 0 | 2 | 1 |

| 408 | 409 | 410 | 411 | 412 | 413 | 414 | 415 |
|---|---|---|---|---|---|---|---|
| 1 1 0 | 1 1 0 | 1 1 0 | 1 1 0 | 1 1 0 | 1 1 0 | 1 1 0 | 1 1 0 |
| 0 1 1 | 0 1 1 | 0 1 1 | 0 1 1 | 0 1 1 | 0 1 1 | 0 1 1 | 0 1 1 |
| 0 0 0 | 0 0 1 | 0 1 0 | 0 1 1 | 1 0 0 | 1 0 1 | 1 1 0 | 1 1 1 |
| 0 | 1 | 0 | 2 | 0 | 0 | 0 | 2 |

| 416 | 417 | 418 | 419 | 420 | 421 | 422 | 423 |
|---|---|---|---|---|---|---|---|
| 1 1 0 | 1 1 0 | 1 1 0 | 1 1 0 | 1 1 0 | 1 1 0 | 1 1 0 | 1 1 0 |
| 1 0 0 | 1 0 0 | 1 0 0 | 1 0 0 | 1 0 0 | 1 0 0 | 1 0 0 | 1 0 0 |
| 0 0 0 | 0 0 1 | 0 1 0 | 0 1 1 | 1 0 0 | 1 0 1 | 1 1 0 | 1 1 1 |
| 2 | 0 | 0 | 0 | 3 | 0 | 3 | 1 |

| 424 | 425 | 426 | 427 | 428 | 429 | 430 | 431 |
|---|---|---|---|---|---|---|---|
| 1 1 0 | 1 1 0 | 1 1 0 | 1 1 0 | 1 1 0 | 1 1 0 | 1 1 0 | 1 1 0 |
| 1 0 1 | 1 0 1 | 1 0 1 | 1 0 1 | 1 0 1 | 1 0 1 | 1 0 1 | 1 0 1 |
| 0 0 0 | 0 0 1 | 0 1 0 | 0 1 1 | 1 0 0 | 1 0 1 | 1 1 0 | 1 1 1 |
| 0 | 0 | 0 | 0 | 1 | 0 | 2 | 2 |

| 432 | 433 | 434 | 435 | 436 | 437 | 438 | 439 |
|---|---|---|---|---|---|---|---|
| 1 1 0 | 1 1 0 | 1 1 0 | 1 1 0 | 1 1 0 | 1 1 0 | 1 1 0 | 1 1 0 |
| 1 1 0 | 1 1 0 | 1 1 0 | 1 1 0 | 1 1 0 | 1 1 0 | 1 1 0 | 1 1 0 |
| 0 0 0 | 0 0 1 | 0 1 0 | 0 1 1 | 1 0 0 | 1 0 1 | 1 1 0 | 1 1 1 |
| 1 | 0 | 2 | 2 | 3 | 0 | 3 | 3 |

| 440 | 441 | 442 | 443 | 444 | 445 | 446 | 447 |
|---|---|---|---|---|---|---|---|
| 1 1 0 | 1 1 0 | 1 1 0 | 1 1 0 | 1 1 0 | 1 1 0 | 1 1 0 | 1 1 0 |
| 1 1 1 | 1 1 1 | 1 1 1 | 1 1 1 | 1 1 1 | 1 1 1 | 1 1 1 | 1 1 1 |
| 0 0 0 | 0 0 1 | 0 1 0 | 0 1 1 | 1 0 0 | 1 0 1 | 1 1 0 | 1 1 1 |
| 2 | 2 | 3 | 3 | 2 | 2 | 3 | 3 |

TABLE 8

| 448 | 449 | 450 | 451 | 452 | 453 | 454 | 455 |
|---|---|---|---|---|---|---|---|
| 1 1 1 | 1 1 1 | 1 1 1 | 1 1 1 1 1 1 | 1 1 1 | 1 1 1 | 1 1 1 |
| 0 0 0 | 0 0 0 | 0 0 0 | 0 0 0 0 0 0 | 0 0 0 | 0 0 0 | 0 0 0 |
| 0 0 0 | 0 0 1 | 0 1 0 | 0 1 1 1 0 0 | 1 0 1 | 1 1 0 | 1 1 1 |
| 3 | 1 | 1 | 0   1 | 0 | 0 | 1 |

| 456 | 457 | 458 | 459 | 460 | 461 | 462 | 463 |
|---|---|---|---|---|---|---|---|
| 1 1 1 | 1 1 1 | 1 1 1 | 1 1 1 1 1 1 | 1 1 1 | 1 1 1 | 1 1 1 |
| 0 0 1 | 0 0 1 | 0 0 1 | 0 0 1 0 0 1 | 0 0 1 | 0 0 1 | 0 0 1 |
| 0 0 0 | 0 0 1 | 0 1 0 | 0 1 1 1 0 0 | 1 0 1 | 1 1 0 | 1 1 1 |
| 3 | 2 | 1 | 1   0 | 0 | 0 | 1 |

| 464 | 465 | 466 | 467 | 468 | 469 | 470 | 471 |
|---|---|---|---|---|---|---|---|
| 1 1 1 | 1 1 1 | 1 1 1 | 1 1 1 1 1 1 | 1 1 1 | 1 1 1 | 1 1 1 |
| 0 1 0 | 0 1 0 | 0 1 0 | 0 1 0 0 1 0 | 0 1 0 | 0 1 0 | 0 1 0 |
| 0 0 0 | 0 0 1 | 0 1 0 | 0 1 1 1 0 0 | 1 0 1 | 1 1 0 | 1 1 1 |
| 2 | 0 | 1 | 1   0 | 0 | 1 | 1 |

| 472 | 473 | 474 | 475 | 476 | 477 | 478 | 479 |
|---|---|---|---|---|---|---|---|
| 1 1 1 | 1 1 1 | 1 1 1 | 1 1 1 1 1 1 | 1 1 1 | 1 1 1 | 1 1 1 |
| 0 1 1 | 0 1 1 | 0 1 1 | 0 1 1 0 1 1 | 0 1 1 | 0 1 1 | 0 1 1 |
| 0 0 0 | 0 0 1 | 0 1 0 | 0 1 1 1 0 0 | 1 0 1 | 1 1 0 | 1 1 1 |
| 3 | 3 | 2 | 3   0 | 1 | 2 | 3 |

| 480 | 481 | 482 | 483 | 484 | 485 | 486 | 487 |
|---|---|---|---|---|---|---|---|
| 1 1 1 | 1 1 1 | 1 1 1 | 1 1 1 1 1 1 | 1 1 1 | 1 1 1 | 1 1 1 |
| 1 0 0 | 1 0 0 | 1 0 0 | 1 0 0 1 0 0 | 1 0 0 | 1 0 0 | 1 0 0 |
| 0 0 0 | 0 0 1 | 0 1 0 | 0 1 1 1 0 0 | 1 0 1 | 1 1 0 | 1 1 1 |
| 3 | 0 | 1 | 0   2 | 0 | 1 | 1 |

| 488 | 489 | 490 | 491 | 492 | 493 | 494 | 495 |
|---|---|---|---|---|---|---|---|
| 1 1 1 | 1 1 1 | 1 1 1 | 1 1 1 1 1 1 | 1 1 1 | 1 1 1 | 1 1 1 |
| 1 0 1 | 1 0 1 | 1 0 1 | 1 0 1 1 0 1 | 1 0 1 | 1 0 1 | 1 0 1 |
| 0 0 0 | 0 0 1 | 0 1 0 | 0 1 1 1 0 0 | 1 0 1 | 1 1 0 | 1 1 1 |
| 3 | 1 | 2 | 2   1 | 1 | 2 | 3 |

| 496 | 497 | 498 | 499 | 500 | 501 | 502 | 503 |
|---|---|---|---|---|---|---|---|
| 1 1 1 | 1 1 1 | 1 1 1 | 1 1 1 1 1 1 | 1 1 1 | 1 1 1 | 1 1 1 |
| 1 1 0 | 1 1 0 | 1 1 0 | 1 1 0 1 1 0 | 1 1 0 | 1 1 0 | 1 1 0 |
| 0 0 0 | 0 0 1 | 0 1 0 | 0 1 1 1 0 0 | 1 0 1 | 1 1 0 | 1 1 1 |
| 3 | 0 | 2 | 2   3 | 1 | 3 | 3 |

| 504 | 505 | 506 | 507 | 508 | 509 | 510 | 511 |
|---|---|---|---|---|---|---|---|
| 1 1 1 | 1 1 1 | 1 1 1 | 1 1 1 1 1 1 | 1 1 1 | 1 1 1 | 1 1 1 |
| 1 1 1 | 1 1 1 | 1 1 1 | 1 1 1 1 1 1 | 1 1 1 | 1 1 1 | 1 1 1 |
| 0 0 0 | 0 0 1 | 0 1 0 | 0 1 1 1 0 0 | 1 0 1 | 1 1 0 | 1 1 1 |
| 3 | 3 | 3 | 3   3 | 3 | 3 | 3 |

Further, the printing mode setting signal, a control signal from the CPU 1, is input into the judgement ROM 49. With this signal, the judgement level can be changed and the judgement result of multivalued pictures, binary pictures, etc., can be forcibly output irrespective of the type of original picture.

In addition, the present invention is not limited to the above described embodiment, but it is also possible to substitute ROM pattern table 60, as shown in FIG. 14 for the multivalued, binary and dither switching circuit 11 and the binary and dither picture concentration generation circuit 12 in FIG. 5. An X counter 61 and a Y counter 62 generate the address data both in the X direction and in the Y direction. Signals for multivalued picture printing from these and the multivalued picture signal from the multivalued concentration pattern generation circuit 6, binary picture signals and dither picture signals from the dither/binary application circuit 8 and judgement signals from the picture type judgement circuit 10 are given to the ROM pattern table 60 as address inputs. In addition, it is also possible to combine the multivalued concentration pattern generation circuit 6 and picture type judgement circuit 10 into the ROM pattern table 60.

Further, binary picture signals may be used for detection of edge sections of multivalued picture signals, detection of thin lines, characters, etc. In the above described embodiment the printing of multivalued pictures is divided by the multivalued concentration pattern method employing FIGS. 3 and 4. The concentration level range of multivalued picture signals is divided into part concentration areas, fixed patterns are selected according to the existence of multivalued picture signals in such part concentration areas, and the printing energy given to dots to constitute selected fixed patterns are carried out by the method to modulate according to the concentration level of multivalued picture signals. It is also effective where the fixed concentration pattern method as shown in FIG. 2, that is, the concentration pattern method employing corresponding patterns one by one at the gradation level of multivalued pictures as fixed patterns, is employed.

In the fixed concentration pattern method, since the printing energy of each dot only takes the binary value, the binary and dither picture concentration generation circuit 12 in FIG. 5 becomes unnecessary.

Further, a dither matrix may be converted to a multivalued concentration pattern, and in that case the quality of the picture is maintained whether switching in the multivalued, binary and dither switching circuit 11 is carried out dot by dot, picture element by picture element, or in larger units.

When color pictures are read by the picture reader 2, a judgement must be carried out on the basis of picture signals by a monochrome image sensor and a color image sensor (high resolution) in the picture reader. As shown in FIG. 15, a color line image sensor 71, having low resolution, and a monochrome (black and white) image sensor 72, having high resolution, form the color picture reader. The resolution of the color image sensor 71 is determined by the matrix size of the picture printing apparatus including the thermal head 80. The color picture signals read by this color image sensor 71 are input into the picture processing means 100 after having been converted to multivalued digital signals (for example, expressed in eight bits) by an A/D converter 73a.

In the picture processing means 100, first the illumination unevenness on the copy surface and sensitivity unevenness of the color image sensor 71 are corrected by a shading correction circuit 74a. A matrix circuit 75 is a circuit to compensate for the hue, concentration, etc. A filtering circuit 76a is a circuit with low-pass characteristics to eliminate high-pass components unnecessary for the color picture printing and to smooth half tone pictures.

The monochrome image sensor 72 having high resolution has been installed in the layout as shown in FIG. 16(a) to read the same line as the color image sensor 71. The resolution ratio between this monochrome image sensor 72 and the color image sensor 71 of low resolution is 1:3. Thus, if the number of dots of the monochrome image sensor is the same as the total number of dots of the color image sensor 71, the resolution of the monochrome image sensor is three times higher than the resolution of the color image sensor 71. This is because the color image sensor 71 is required to read portions of three colors from same number of dots.

Monochrome picture signals read by the monochrome image sensor 72 of high resolution are corrected by the shading correction circuit 74b through the A/D converter 73b, similar to color picture signals from the color image sensor 71, and are input to the filtering circuit 76b. The filtering circuit 76b has a high-pass characteristic different from the filtering circuit 76a, and passes sharp variations of input picture signals. The output of this filtering circuit 76b is utilized in the binary judgement circuit 77 in the next stage as an edge detection signal for binary pictures. The binary judgement circuit 77 determines which portions of a picture are multivalued and which portions are binary from the output of the filtering circuit 76b, and generates a switching signal for multivalued/binary printing.

A color conversion circuit 78 converts three-color (for example, R, G and B) picture signals read by the color image sensor 71 to the four colors of yellow, magenta, cyan and black necessary for the thermal copy printing. Also, the circuit 78 determines the binary picture concentration and color determination in the areas judged as binary.

The multivalued pattern printing circuit 79 converts the data of multivalued picture signals to multivalued patterns of N×M. The circuit 79 also converts the multivalued patterns to corresponding printing pulse widths. The pulse widths correspond to values of printing energy. The thermal head in the color picture printing means is driven in response to this pulse width, and carries out the thermal copy printing.

Further, this multivalued pattern printing circuit 79 is used for printing mixed multivalued/binary pictures. The circuit 79 divides the concentration level range of multivalued picture signals into partial concentration areas, for example, low-concentration area, medium-concentration area and high-concentration area, employs three fixed patterns "A" to "C" in correspondence with these partial concentration areas, and modulates the printing energy for each dot composing the fixed patterns "A" to "C" according to the concentration level of the multivalued picture signals.

In the case of binary pictures, the printing energy for each dot is individually modulated according to the binary picture signal.

Thus, in this embodiment the color picture processing system and monochrome picture processing system were separate. As shown in FIG. 17, it is also possible to combine these two processing systems in a color copying machine. In FIG. 17 a switching circuit 84 switches and outputs the output of the color image sensor 71 and the output of the monochrome image sensor 72. An A/D converter 85, a shading correction circuit 86, a matrix circuit 87 and a filtering circuit 88 are commonly employed both for color picture processing and monochrome picture processing.

Further, in this embodiment one dimensional image sensors 71 and 72 were utilized. However, a two dimensional image sensor may be substituted.

Further, in this embodiment it was judged whether images were multivalued or binary, and color picture signals were generated on the basis of that judgement. However, for example, edge detection of pictures may be carried out on the basis of picture signals from the monochrome image sensor, while color picture signals to generate an image with monochrome-generated edge emphasis treatment. In above-mentioned embodiment shown in FIGS. 16 and 17, the results of the judgement are limited binary or multivalued, because an undetermined picture is provided with the dither method; described in FIG. 5.

What is claimed is:

1. A picture printing apparatus for reproducing an original image, comprising:

signal generating means for generating a picture signal from each of a plurality of individual areas on the original image, each area being divided into a plurality of dot segments;

judgment means for indicating whether the picture signal generated from the original image is from a multivalued picture or a binary picture or whether the type of picture signal cannot be determined;

first pattern generating means for generating a multivalued concentration pattern in response to a determination from the judgement means indicating that the generated picture signal from the original image is from a multivalued pictured, said multivalued concentration pattern comprising variable dot values each corresponding to one dot segment of the original image;

second pattern generating means for generating one of a binary pattern and a dither pattern in response to a determination from the judgment means indicating that the generated picture signal from the original image is from a binary picture, said binary pattern comprised of dot values each having one of two fixed values corresponding to one dot segment of the original image and generating said dither pattern in response to a determination from the judgment means indicating that the type of picture signal generated from the original image cannot be determined, said dither pattern including one of a plurality of fixed threshold dot values each corresponding to one of said dot segments of the original image;

selecting means for selecting dot values from the binary pattern when the original image is a binary picture, the multivalued pattern when the original image is a multivalued picture, and the dither pattern when the type of picture signal detected from the original image cannot be determined, said selected dot values corresponding to each individual dot segment to be printed; and printing means for printing dots in the dot segments corresponding to the selected dot values in response to the selecting means for reproducing the original image.

2. A picture printing apparatus for reproducing an original color image, comprising:

signal generating means for generating a picture signal from each of a plurality of individual areas on the original image, each area being divided into a plurality of dot segments, the signal generating means including a high resolution sensor and a low resolution sensor;

judgment means for judging whether the picture signal generated from the original image is from a multivalued picture or a binary picture on the basis of an output from the high resolution sensor;

first modulating means, when the judgment means judges that the picture signal generated from the original image is from the multivalued picture, for modulating a recording energy applied to dots forming each of a plurality of fixed patterns in accordance with a concentration level of the multivalued picture signal obtained through the low resolution sensor by using the plurality of fixed patterns each being comprised of a matrix of dots corresponding to one pixel and having various types of dot patterns being previously defined in accordance with plural stages of partial concentration levels of the multivalued picture signal, so as to generate a color picture signal for output;

second modulating means, when the judgment means judges that the picture signal generated from the original image is from the binary picture, for individually modulating the recording energy applied to each dot corresponding to one dot segment of the original image in response to the binary picture signal obtained through the high resolution sensor so as to generate a color picture signal for output; and a printer which transfers ink or toner in response to the picture signal, for selectively printing the color picture signals on the basis of the judgment by the judgment means to reproduce the original image.

* * * * *